Patented Aug. 15, 1939

2,169,558

UNITED STATES PATENT OFFICE 2,169,558

STIFFENING FOR BOX TOES

Harry Robert Dittmar, Wilmington, Del., assignor to E. I. du Pont de Nemours & Company, Wilmington, Del., a corporation of Delaware No Drawing. Application July 17, 1937,
Serial No. 154,207

23 Claims. (Cl. 12—146)

This invention relates to a process for the preparation of shoe stiffeners, being more especially concerned with thermoplastic methacrylic acid ester stiffeners such as can be incorporated into the toe portion or a shoe upper in a heat-softened, moldable condition and which therein can be moulded to the shape of the last during the operations of pulling-over and bed-lasting.

The stiffening used in the toe caps of shoes has generally been made of material impregnated with a solution of a cellulose ester, particularly cellulose nitrate, although cellulose acetate has been employed in recnt years to some extent. Solutions of cellulose esters, even when they are highly viscous, contain only a small proportion of solids and the impregnating operation is correspondingly difficult. Owing to the sparing solubility of these compositions, it is impossible to make highly concentrated solutions, thus increasing transportation expense or compelling the customer to prepare his own solutions, which introduces difficulties due to inflammability and non-uniformity of the finished article. Perhaps of more far reaching importance, the cellulose esters have not in themselves any considerable adhesiveness, and, in addition, being likewise inelastic, require large amounts of softening agents and adhesive agents, which complicates the preparation of the composition and, as common addition agents tend to volatilize slowly, results in a product which rapidly deteriorates.

An object of the present invention is to provide a thermoplastic resin, for the treatment of the fabric or felt foundation of box toes and shoe quarters, comprising a flexible, highly elastic adhesive polymeric ester of acrylic and/or methacrylic acid. Another object of the invention is to provide various methods for applying the thermoplastic resin to the fabric or felt. Yet another object is to provide for this purpose polymeric n-propyl and n-butyl methacrylates which, due to their flexibility under normal temperatures, high adhesive qualities and thermoplastic nature, are especially well adapted for use in the construction of box toes and shoe quarters. Other objects and advantages of the invention will hereinafter appear.

According to this invention many of the objections of the above thermoplastic materials of the art are overcome by impregnating the absorptive base which may be constructed of cotton or wool fabric, canvas, felt, etc., with derivatives of polymeric acrylic acid and methacrylic acid as well as the polymeric acids per se. While the polymeric esters of acrylic acid generally are well suited for this purpose due to their initial flexibility, since no plasticizers or addition agents are usually required to render them flexible, the polymeric methyl ester of the methacrylic acid series requires plasticizers or addition agents to impart the desired flexibility. These resins require, however, no adhesive assistance as their adhesive characteristics are excellent. The higher polymeric esters of methacrylic acid, and more particularly n-propyl methacrylate, n-butyl methacrylate, amyl methacrylate, are exceptionally well suited, since these esters of methacrylic acid may be used wholly without addition agents, if desired, due to their high flexibility and excellent adhesive qualities. In addition, the comparatively new compounds may be used which are prepared by the interpolymerization of the monomeric esters of methacrylic acid, including methyl methacrylate, with the esters of acrylic acid, as well as the interpolymers of a methacrylic acid ester with another methacrylic acid ester, or with methacrylic acid per se or salts thereof, as well as salts of similar acrylic acid interpolymers. Polymeric derivatives of acrylic and methacrylic acids such, for example, as the nitriles, amides, and imides of these acids may also be employed. I prefer, for most purposes, to employ polymeric methacrylic acid esters of the aliphatic alcohols having from 3 to 8 carbon atoms. It will be appreciated that due to the excellent characteristics of the polymeric higher alcohol esters of methacrylic acid a range of flexibility is provided which enables the shoe manufacturer to select exactly the specific compositions which he finds are most suitable for the particular design and grade of shoe to be fabricated.

As has been indicated, applicant prefers to employ the higher polymeric esters of methacrylic acid and more particularly polymeric n-butyl and n-propyl methacrylates, for the reason that these esters, unmodified by the presence of addition agents, may be applied directly, and, accordingly, are most economical from the standpoint of ease in preparation. When the less plastic esters are employed, such as methyl and ethyl methacrylate, plasticizing agents should usually be employed to obtain the desired flexibility. This may be effected by the addition of the well-known plasticizers or by interpolymerization of these esters with the more flexible higher esters of methacrylic acid or acrylic acid. Esters such as octyl, lauryl methacrylate and the like, because of their high flexibility, should, for most purposes, usually be made less flexible by the addition of hard resins such as rosin, copal, damar gum, etc.

It is often desirable to use resins which have high penetrating powers. For this use I have found that the polymeric methacrylate esters of n-propanol, n-butanol, and, in general, the esters of alcohols containing 3 to 8 carbon atoms should be mixed with modifying agents such as rosin, copal, ester gum, damar, etc., in amounts sufficient to give a hot melt having the degree of penetration desired. For example, a composition of exceptional penetrating power contains 20% n-butyl methacrylate polymer and 80% rosin. Similar portions of the other polymeric esters and modifying agents may be used.

The absorptive base from which the quarters or box toes are constructed may be impregnated with the above designated thermoplastic resins by various methods. For example, these resins may be applied, although, as has been indicated above, it is not the most desirable method, by dissolving the esters or interpolymer in a suitable solvent and impregnating the material with the solution from which the solvent may be expelled prior to or subsequent to, the formation of the particular shape. Other methods, however, may be employed which eliminate many of the disadvantages inherent in the use of solvent mixtures such as the use of hot melts prepared by incorporating with the polymeric acrylic and methacrylic acid or derivative a natural or synthetic resin to impart to the resulting composition a high degree of fluidity when the same is heated to a temperature above 100° C. The material may be immersed in the fluid hot melt or applied by spraying, spreading or roller coating, if desired. Hot melt compositions which are well adapted for the treatment of absorptive bases may be made, examples of which are:

| | |
|---|---|
| n-butyl methacrylate | 60%—damar gum 40% |
| n-butyl methacrylate | 60%—rosin 40% |
| n-butyl methacrylate | 80%—coumarone-indene 20% resin—M. P.—95–120° C. |
| Iso-butyl methacrylate | 90%—rosin 10% |
| Methyl methacrylate | 50%—coumarone-indene 50% resin—M. P.—5–15° C. |
| Methyl acrylate | 50%—damar 50% |
| Methyl acrylate | 50%—coumarone-indene 50% resin—M. P.—95–126° C. |
| Interpolymer containing n-butyl methacrylate _____ 50% Iso-butyl methacrylate _____ 50% | 50%—coumarone-indene 50% resin—M. P.—95–126° C. |

% is by weight.

A most economical method of utilizing the above enumerated thermoplastic resins is from their emulsified form, which may be prepared by emulsifying a solution of the polymeric resin or by emulsifying the monomeric compound and then polymerizing. The acrylic and methacrylic acids and derivatives, with or without natural or synthetic resins such as damar, copal, ester gum, etc., are emulsified and polymerized in aqueous solution and the aqueous solution used to impregnate the base. Such emulsions may be prepared from, for example:

| | Parts by weight |
|---|---|
| Methyl methacrylate monomer | 2126 |
| Benzoyl peroxide | 21 |
| Higher alcohol phthalates | 709 |
| Distilled water | 8505 |
| Sodium lauryl sulfate | 85 |

The benzoyl peroxide and plasticizer are dissolved in the monomer to form solution A, while the sodium lauryl sulfate is added to the water to make solution B. Solutions A and B are mixed and circulated thru a dispersion mill for about 5 minutes at room temperature. The emulsion is then placed in a 65° C. oven for approximately 24 hours to polymerize the monomeric methyl methacrylate. Various water emulsions are available for this purpose and it will be appreciated that no expensive recovery systems are required as is necessary when a highly volatile vehicle is used in accord with the usual processes of the prior art.

Still another method of applying these thermoplastic resins consists in calendering the resin into a sheet form, which method is particularly applicable to the flexible n-propyl and n-butyl methacrylates, the thus prepared calendered sheet being employed as a lamina between the plies used in a multiply shoe stiffener, the thus built-up stiffener being formed in the usual manner.

It will be understood that in the production of box toes for shoes, in accord with the present invention, suitable banks of felt or other base, saturated either with a solution, hot melt or aqueous emulsion of a polymeric ester of methacrylic acid or interpolymer thereof, may be partially dried, if necessary, or the box toe blanks may be cut from an impregnated sheet and formed by the application of heat to the desired shape. It is customary to dip an impregnated blank in a solvent, to soften the stiffening material to apply it in a thus softened state and subsequenly to eliminate the solvent. This method, if desired, be used, but the thermoplastic setting method is preferred.

From a consideration of the above specification, it will be appreciated that many changes may be made in the details therein given without in any way departing from the scope of the invention or sacrificing any of the advantages that may be derived therefrom.

I claim:

1. A molded stiffened member for shoes comprising an absorptive base impregnated with a polymeric compound selected from the group consisting of acrylic acid, esters of acrylic acid, methacrylic acid, interpolymers and derivatives thereof.

2. A molded stiffened member for shoes comprising an absorptive base impregnated with a polymeric compound selected from the group consisting of acrylic acid, esters of acrylic acid, methacrylic acid, esters of methacrylic acid, interpolymers and derivatives thereof and a plasticizer.

3. A molded stiffened member for shoes comprising an absorptive base impregnated with a polymeric compound selected from the group consisting of acrylic acid, esters of acrylic acid, methacrylic acid, interpolymers and derivatives thereof, modified by the addition of a resin of the group consisting of rosin, copal, ester gum, damar and coumarone-indene.

4. A molded stiffened member for shoes comprising an absorptive base impregnated with a polymeric compound selected from the group consisting of acrylic acid, esters of acrylic acid, methacrylic acid, esters of methacrylic acid, interpolymers and derivatives thereof, modified by the addition of a resin of the group consisting of rosin, copal, ester gum, damar and coumarone-indene.

5. A box toe for shoes comprising an absorptive base impregnated with a polymeric ester of methacrylic acid.

6. A box toe for shoes comprising an absorptive base impregnated with a polymeric ester of methacrylic acid, modified by the addition of a resin of the group consisting of rosin, copal, ester gum, damar and coumarone-indene.

7. A box toe for shoes comprising an absorptive base impregnated with an aliphatic saturated alcohol polymeric ester of methacrylic acid.

8. A shoe upper comprising an absorptive base impregnated with a three to eight carbon atom aliphatic alcohol polymeric ester of methacrylic acid.

9. A shoe upper comprising an absorptive base impregnated with a three to eight carbon atom aliphatic alcohol polymeric ester of methacrylic acid, modified by the addition of a resin of the group consisting of rosin, copal, ester gum, damar and coumarone-indene.

10. A box toe for shoes comprising an absorptive base impregnated with a three to eight carbon atom alcohol ester of polymeric methacrylic acid and a plasticizer.

11. A box toe for shoes comprising an absorptive base impregnated with polymeric n-propyl methacrylate.

12. A box toe for shoes comprising an absorptive base impregnated with 60% n-propyl methacrylate and 40% rosin.

13. A box toe for shoes comprising an absorptive base impregnated with polymeric n-butyl methacrylate.

14. A box toe for shoes consisting of a plurality of absorptive base lamina and a film of a polymeric compound selected from the group consisting of acrylic acid, esters of acrylic acid, methacrylic acid, an ester of methacrylic acid, interpolymers and derivatives thereof.

15. A process for the preparation of an absorptive base impregnated with a polymeric methacrylic acid ester thermoplastic resin for the formation of a molded stiffened member for shoes which comprises impregnating the absorptive base with an aqueous emulsion of a polymeric ester of methacrylic acid, subsequently removing the water therefrom and finally forming the thus impregnated absorptive base to the desired shape.

16. A process for the preparation of an absorptive base impregnated with a polymeric methacrylic acid ester thermoplastic resin for the formation of a molded stiffened member for shoes which comprises impregnating the absorptive base with an aqueous emulsion of a polymeric ester of methacrylic acid, which had been modified prior to emulsification by the addition of a resin of the group consisting of rosin, copal, ester gum, damar, and coumarone-indene, subsequently removing the water therefrom and finally forming the thus impregnated absorptive base to the desired shape.

17. A process for the preparation of an absorptive base impregnated with a polymeric methacrylic acid n-butyl ester resin for the formation of box toes which comprises impregnating the absorptive base with an aqueous emulsion of polymeric n-butyl methacrylate, subsequently removing the water therefrom and finally forming the thus impregnated absorptive base to the desired shape.

18. A process for the preparation of an absorptive base impregnated with a polymeric methacrylic acid ester resin for the formation of box toes which comprises impregnating the absorptive base with a polymeric methacrylic acid ester hot melt composition, cooling the thus impregnated base and finally forming the impregnated absorptive base to the desired shape.

19. A material for box toe stiffeners and the like, comprising a base impregnated with a mixture including a methacrylate ester polymer.

20. A material for box toe stiffeners and the like, comprising a base impregnated with a mixture including a polymer formed from a methacrylic acid ester of an aliphatic monohydric alcohol.

21. A material for box toe stiffeners and the like, comprising a base impregnated with a mixture of a methacrylate ester polymer and a thermo-plastic material.

22. A material for box toe stiffeners and the like, comprising a base impregnated with a mixture of a thermo-plastic material and a polymer formed from a methacrylic acid ester of an aliphatic monohydric alcohol.

23. A box toe stiffening material, comprising a base impregnated with a mixture of thermoplastic material and one or more of a group comprising normal butyl methacrylate polymer, methyl methacrylate polymer, n-propyl methacrylate polymer, and isobutyl methacrylate polymer.

HARRY ROBERT DITTMAR,